US010869580B2

(12) United States Patent
Harris et al.

(10) Patent No.: US 10,869,580 B2
(45) Date of Patent: Dec. 22, 2020

(54) ACTUATING MECHANISMS FOR MANUAL DISPENSERS

(71) Applicant: GOJO Industries, Inc., Akron, OH (US)

(72) Inventors: Donald R. Harris, Mogadore, OH (US); Aaron D. Marshall, Uniontown, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 16/866,677

(22) Filed: May 5, 2020

(65) Prior Publication Data

US 2020/0260918 A1 Aug. 20, 2020

Related U.S. Application Data

(63) Continuation of application No. 15/839,196, filed on Dec. 12, 2017, now Pat. No. 10,653,277.

(Continued)

(51) Int. Cl.
*A47K 5/12* (2006.01)
*B05B 9/04* (2006.01)
(Continued)

(52) U.S. Cl.
CPC .......... *A47K 5/1211* (2013.01); *A47K 5/1207* (2013.01); *B05B 9/0426* (2013.01);
(Continued)

(58) Field of Classification Search
CPC .......... A47K 5/1211; A47K 5/12; A47K 5/14; B05B 15/65; B05B 9/0426; E05B 65/006; F04B 43/10; B65D 83/267
See application file for complete search history.

(56) References Cited

U.S. PATENT DOCUMENTS 5,443,236 A * 8/1995 Bell .......................... A47K 5/12 222/181.2
5,445,288 A * 8/1995 Banks ................... B05B 7/0025 222/95

(Continued)

FOREIGN PATENT DOCUMENTS

DE 10 2014 010827 A1 1/2016

OTHER PUBLICATIONS

International Search Report and Written Opinion of the International Searching Authority for International Appl. No. US17/65813 dated Mar. 21, 2018, 12 pages.

*Primary Examiner* — Benjamin R Shaw
(74) *Attorney, Agent, or Firm* — Calfee, Halter & Griswold LLP

(57) ABSTRACT

Exemplary embodiments of manual dispensers and actuating mechanisms are disclosed herein. An exemplary dispenser includes a housing, a receptacle for receiving a container of fluid and an actuating mechanism for causing fluid to be dispensed from the container. The actuation mechanism has a first pivot arm having a pivot point on a first end and a cam on a second end and a second pivot arm having a pivot point a first end and a curved contact surface on a second end. The actuating mechanism includes a pushbar. One of the first and second pivot members is connected to the pushbar. When the pushbar is pushed inward, the cam is configured to travel along the curved contact surface. Movement of the cam along the curved contact surface moves the engagement mechanism upward and downward in a substantially linear motion when the engagement mechanism is connected to a pump to cause the pump to prime with fluid and dispense the fluid.

20 Claims, 5 Drawing Sheets

Related U.S. Application Data

(60) Provisional application No. 62/433,871, filed on Dec. 14, 2016.

(51) Int. Cl.

| | |
|---|---|
| ***B05B 15/62*** | (2018.01) |
| ***F04B 43/10*** | (2006.01) |
| ***A47K 5/14*** | (2006.01) |
| ***E05B 65/00*** | (2006.01) |

(52) U.S. Cl.
CPC ................ *B05B 15/62* (2018.02); *A47K 5/14* (2013.01); *E05B 65/006* (2013.01); *F04B 43/10* (2013.01)

(56) References Cited

U.S. PATENT DOCUMENTS

| | | | | |
|---|---|---|---|---|
| 5,625,659 | A * | 4/1997 | Sears .................... | G01F 11/088 377/21 |
| 6,832,701 | B2 * | 12/2004 | Schiller ................ | B65D 83/384 222/181.3 |
| 8,662,355 | B2 * | 3/2014 | Spiegelberg ............. | A47K 5/14 222/190 |
| 9,700,181 | B1 * | 7/2017 | Santoro ................ | A47K 5/1211 |
| 2004/0031816 | A1 * | 2/2004 | Schuman ................. | A47K 5/14 222/181.3 |
| 2009/0032552 | A1 * | 2/2009 | Ophardt ................ | G01F 11/025 222/181.3 |
| 2009/0266842 | A1 * | 10/2009 | Snodgrass ............ | A47K 5/1217 222/52 |
| 2010/0252568 | A1 * | 10/2010 | Ciavarella ............ | A47K 5/1202 222/1 |
| 2014/0124531 | A1 * | 5/2014 | Muderlak ............. | G06M 1/083 222/36 |
| 2014/0189992 | A1 * | 7/2014 | Ganzeboom ........ | B05B 11/3022 29/402.08 |

* cited by examiner

ACTUATING MECHANISMS FOR MANUAL DISPENSERS

The application is a continuation of U.S. Non-Provisional patent application Ser. No. 15/839,196 titled Actuating Mechanisms for Manual Dispensers filed on Dec. 12, 2017, which claims priority to and the benefits of U.S. Provisional Pat. Ser. No. 62/433,871 titled Actuating Mechanisms for Manual Dispensers filed on Dec. 14, 2016. Both of which are incorporated herein by reference in their entirety.

TECHNICAL FIELD

The present invention relates generally to manual dispensers and more particularly to manual dispensers with improved actuating mechanisms that require a low force to operate.

BACKGROUND OF THE INVENTION

Liquid dispenser systems, such as liquid soap and sanitizer dispensers, provide a user with a predetermined amount of liquid upon actuation of the dispenser. In addition, it is sometimes desirable to dispense the liquid in the form of foam by, for example, injecting air into the liquid to create a foamy mixture of liquid and air bubbles. Often times the dispenser systems are hung on a wall and, accordingly, it is preferable to reduce the space taken up by the pumping and foaming apparatus as well as the overall footprint of the dispenser system. Unfortunately reducing the size of the dispenser creates a problem with pushbar actuated manual dispensers because a shorter pushbar results in less leverage, which results in higher forces to operate the dispenser. It is desirable to have a dispenser with a small footprint that requires less energy to operate.

SUMMARY

Exemplary embodiments of manual dispensers and actuating mechanisms are disclosed herein. An exemplary dispenser includes a housing, a receptacle for receiving a container of fluid and an actuating mechanism for causing fluid to be dispensed from the container. The actuating mechanism has a first pivot arm having a pivot point on a first end and a cam on a second end and a second pivot arm having a pivot point a first end and a curved contact surface on a second end. The actuating mechanism includes a pushbar. One of the first and second pivot members is connected to the pushbar. When the pushbar is pushed inward, the cam is configured to travel along the curved contact surface. Movement of the cam along the curved contact surface moves the engagement mechanism upward and downward in a substantially linear motion when the engagement mechanism is connected to a pump to cause the pump to prime with fluid and dispense the fluid.

Another exemplary manual dispenser includes a housing, a receptacle for receiving a container of fluid and an actuating mechanism for causing fluid to be dispensed from the container. The actuation mechanism includes a first pivot arm having a pivot point on a first end and a cam on a second end. The first pivot arm is connected to one of the front portion and rear portion of the dispenser. The actuating mechanism also includes a second pivot arm having a pivot point on a first end and a curved contact surface on a second end. The second pivot arm is connected to the other of the front portion and rear portion of the dispenser. The actuating mechanism also includes a pushbar. One of the first and second pivot members is connected to the pushbar. An engagement mechanism having a connector for connecting to one of the first pivot member and the second pivot member is also included. The engagement member has an receptacle for receiving a pump. When the pushbar is pushed inward, the cam is configured to travel along the curved contact surface. Movement of cam along the curved contact surface moves the engagement mechanism upward and downward to dispense fluid and to prime the pump.

Another exemplary manual dispenser includes a housing, a receptacle for receiving a container of fluid and an actuating mechanism for causing fluid to be dispensed from the container. The actuation mechanism includes a first pivot arm having a pivot point on a first end and a cam on a second end. A second pivot arm is included and it has a pivot point a first end and a curved contact surface on a second end. The actuator includes a pushbar formed as a part of one of the first pivot arm and the second pivot arm. The pushbar rotates about the same pivot point as one of the first pivot arm and the second pivot arm. When the pushbar moves the cam is configured to travel along the curved contact surface to dispense fluid or prime the pump.

BRIEF DESCRIPTION OF THE DRAWINGS

These and other features and advantages of the present invention will become better understood with regard to the following description and accompanying drawings in which.

DETAILED DESCRIPTION

Figure 1:
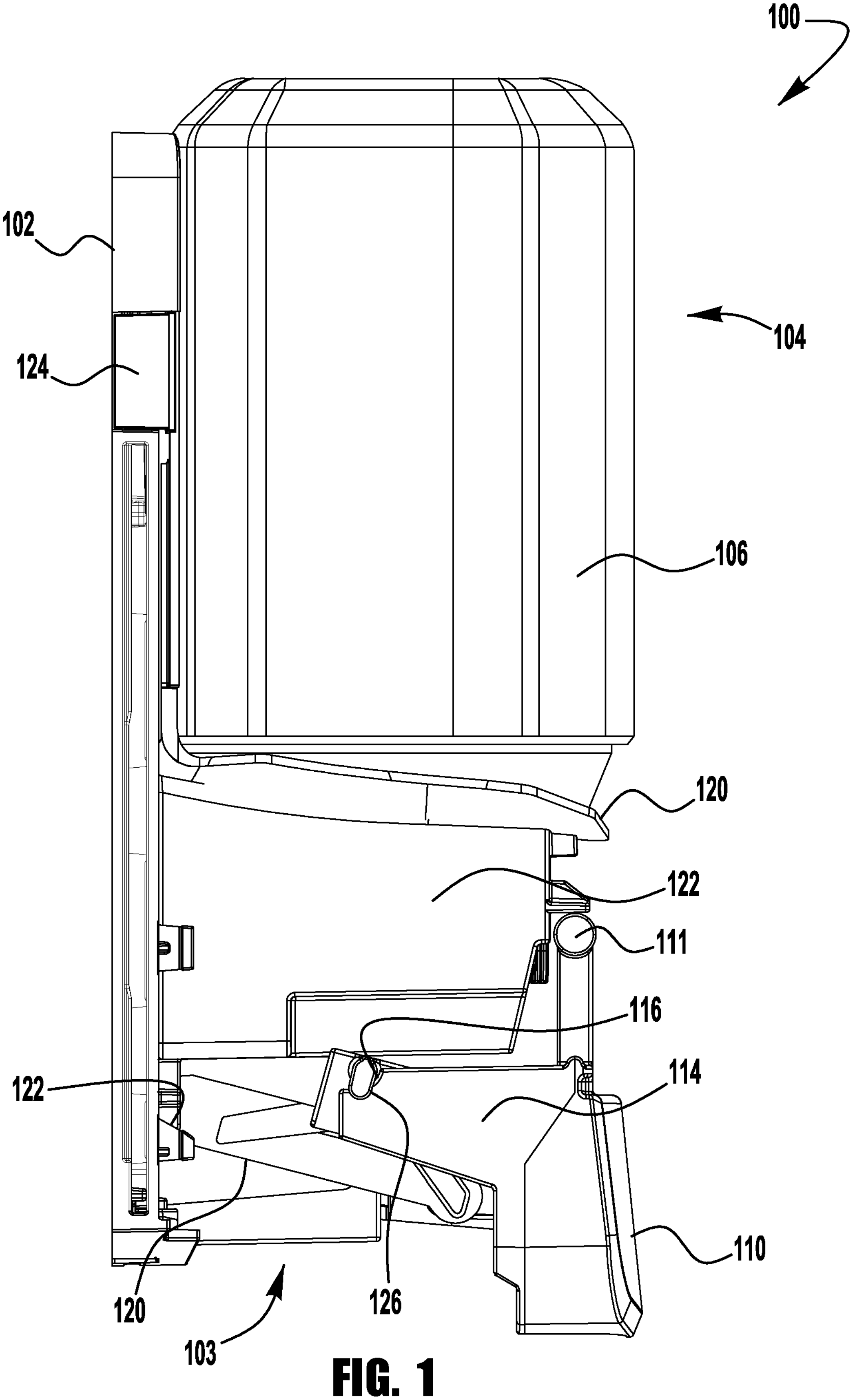
FIG. 1 is a partial cross-sectional view of an exemplary embodiment of a dispenser having a pushbar and a novel actuation mechanism.

FIG. 1 is a partial cross-sectional view of an exemplary embodiment of a dispenser 100 having a pushbar 110 and a novel actuation mechanism 103 with a portion of the housing 102 has been removed. Dispenser 100 includes a refill unit 104. Refill unit 104 includes a container 106 having a pump 208 (FIG. 2) for dispensing fluid. Dispenser 100 includes a housing 102. The housing 102 of the exemplary dispenser 100 slides downward to facilitate inserting and removal of a refill unit 106 by first pushing in pushbutton(s) 124. For additional detail on an exemplary housing dispenser, see U.S. Non-Provisional patent application Ser. No. 15/281,832 titled SLIDE OPEN REFILLABLE DISPENSER, which was filed on Sep. 31, 2016 and which is incorporated herein by reference in its entirety.

Housing 102 includes a cover plate 120 which also forms part of opening 520 that receives the foam pump 208 of refill unit 104. Plate 120 connects to member 122. Dispenser 100 includes a pushbar 110 that has a pivot point 111. Pivot point 111 is secured to the front portion of the dispenser, such as for example, member 122 and allows for pivotal motion of pushbar 110. In some embodiments, pivot point 111 is secured to from portion of housing 102. Pushbar 110 includes a first pivot arm 114. First pivot arm 114 includes a curved contact surface 116, which will be described in more detail below.

Dispenser 102 also includes a second pivot arm 120 that is attached to the rear portion of the dispenser housing 102, such as for example, at pivot point 122. Second pivot arm 120 includes a cam 126 that rides on curved contact surface 116. Cam 126 is shown as a cylindrical projection, however, cam 126 may have any configuration provided that rides along the curved contact surface 116. As pushbar 110 moves inward, the curved contact surface 116 of first pivot arm 114 moves upward. The upward movement of curved contact surface 116 causes cam 126 to move upward and travel along the curved contact surface 116 causing second pivot arm 120 to move upward.

Figure 2:
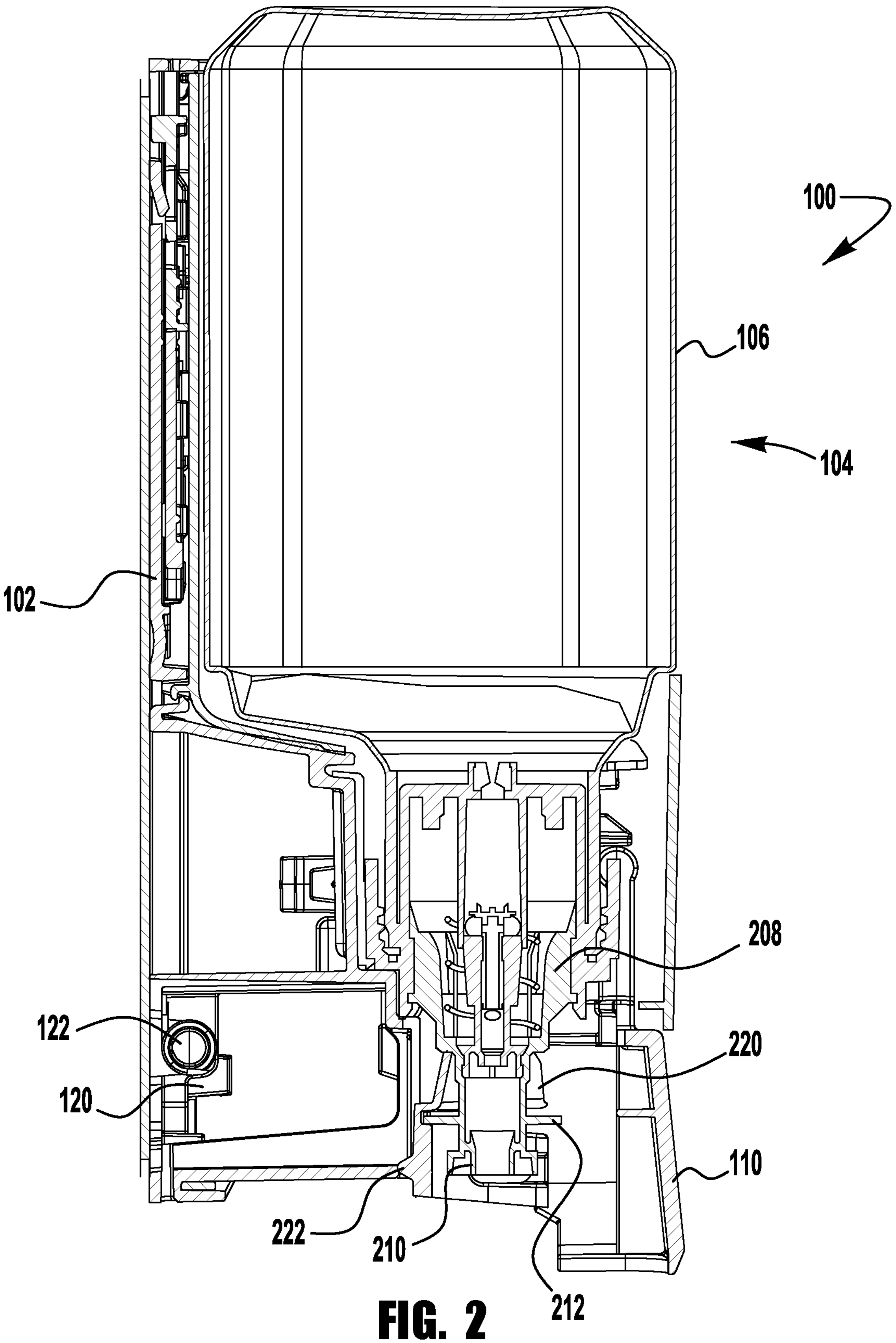
FIG. 2 is a cross-sectional view of the exemplary embodiment of a dispenser having a pushbar and a novel actuation mechanism.

FIG. 2 is a cross-sectional view of dispenser 100 showing pump 208 connected container 106 forming refill unit 104. Pump 208 includes a nozzle 210 and flange 212. Connected to the second pivot arm 120 is an engagement mechanism 220, which is better shown in FIGS. 5 and 6. Engagement mechanism 220 includes an annular groove 222 that releasably engages with flanged 212 when refill unit 104 is installed in dispenser housing 102. Accordingly upward and downward movement of engagement mechanism 220 causes upward and downward movement of flange 222, which operates pump 208. In this exemplary embodiment, upward movement of flange 222 dispenses fluid out of outlet 210 and downward movement of flange 222 primes pump 208. In some exemplary embodiments, cam 126 is on the first pivot arm 114 and the curved contact surface 116 is on second pivot arm 120.

Figure 3:
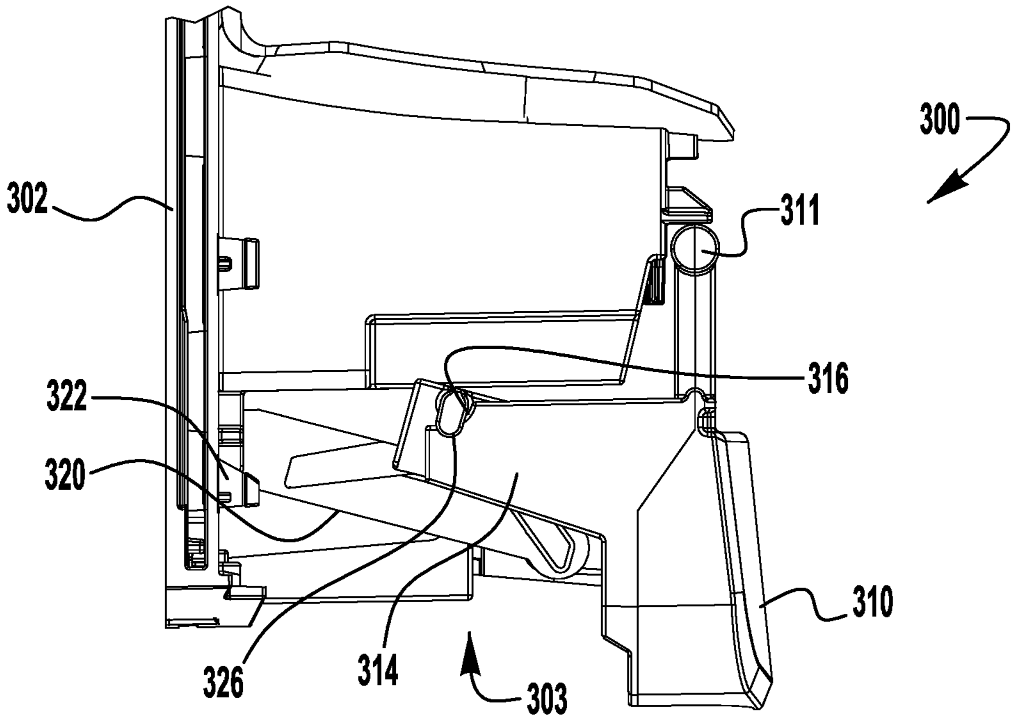
FIG. 3 is a partial cross-sectional view of a similar actuating mechanism in a rest position.

FIG. 3 is a partial cross-sectional view of a similar exemplary embodiment of a dispenser 300 having a pushbar 310 and a novel actuation mechanism 303 with a portion of the housing 302 removed. Novel actuating mechanism 303 is shown in the rest position. The housing 302 of the exemplary dispenser 300 slides downward to facilitate inserting and removal of a refill unit by first pushing in one or more pushbuttons (not shown).

Housing 302 includes a cover plate 321 which also forms part of opening 520 (FIG. 5) that receives the foam pump 208 of a refill unit (not shown). Cover plate 321 connects to member 322. Dispenser 300 includes a pushbar 310 that has a pivot point 311 on the front portion of the dispenser 300. In some embodiments, pivot point 311 is secured to member 322 and allows for pivotal motion of pushbar 310. In some embodiments, pivot point 311 is secured to a front portion of housing 302. Pushbar 310 includes a first pivot arm 314. First pivot arm 314 includes a curved contact surface 316, which will be described in more detail below.

Dispenser 302 includes a second pivot arm 320 that is attached to dispenser housing 302 at pivot point 322. Second pivot arm 320 includes a cam 326 that travels along curved contact surface 316. In some exemplary embodiments, cam 326 is on the first pivot arm 314 and the curved contact surface 316 is on second pivot arm 320. Cam 326 is shown as a cylindrical projection, however, cam 326 may have any configuration provided that rides along the curved contact surface 316.

Figure 4:
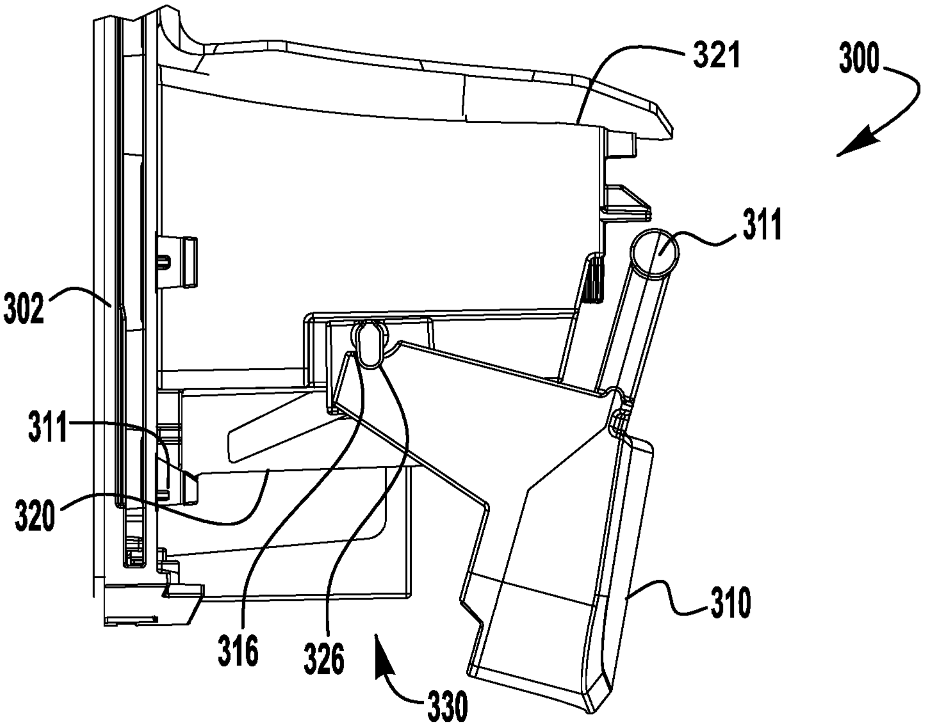
FIG. 4 is a partial cross-sectional view of the similar actuating mechanism in an actuated position.

As pushbar 310 moves inward (illustrated in FIG. 4), the curved contact surface 316 of first pivot arm 314 moves upward. The upward movement of curved contact surface 316 causes cam 326 to move upward and travel along the curved contact surface 316 causing second pivot arm 320 to move upward.

Figure 5:
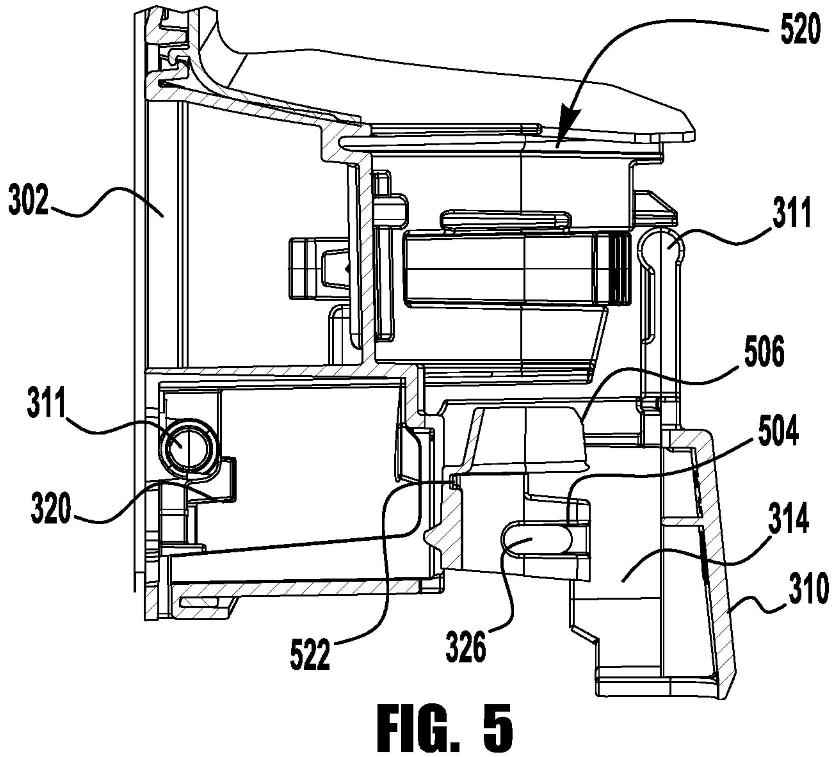
FIG. 5 is a partial cross-sectional view of the actuating mechanism in a rest position.
Figure 6:
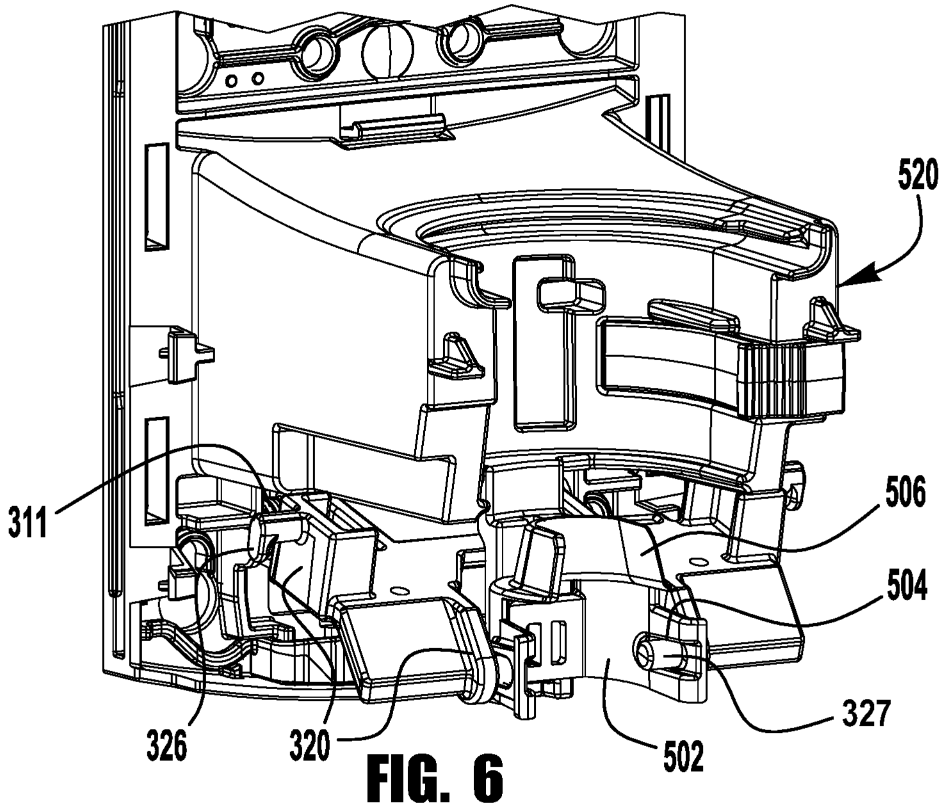
FIG. 6 is a partial cross-sectional view of the actuating mechanism in a rest position.

FIGS. 5 and 6 are partial cross-sections of dispenser 300. As can be seen in FIG. 5, there is an opening 520 for receiving portion of refill unit. In this exemplary embodiment, engagement mechanism 502 includes slots 504. Slots 504 fit over annular projections 327 which are located on the end of second pivot 320. As second pivot arm 320 moves upward, engagement mechanism 502 moves upward as well and because engagement mechanism 502 is connected to the end of the pump (not shown) which moves in linear directions (upward and downward), engagement mechanism 502 moves in a linear direction upward and downward. Other types of connections may be used provided that they allow movement of the engagement mechanism 502 in a linear direction even though second pivot arm 320 and cam 326 do not move in a linear direction.

Figure 7:
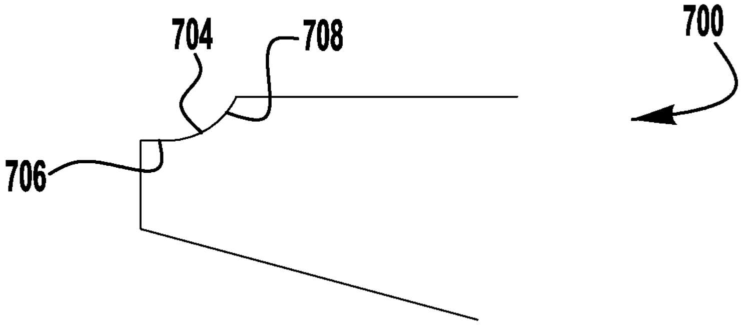
FIG. 7-10 illustrate various embodiments of exemplary curved contact services.

FIG. 7 illustrates an exemplary pivot arm 700. Pivot arm 700 includes a curved contact surface 704. Curved contact surface 704 has a first portion 706 and the second portion 708. First portion 706 is gradually curved upward, and second portion 708 has a steeper upward curve. In some exemplary embodiments, curved contact surface 704 has more than two portions. In some exemplary embodiments, curved contact surface 704 has less than two portions.

Figure 8:
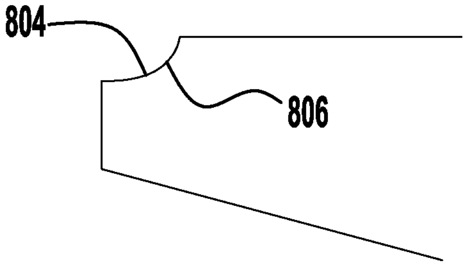

FIG. 8 illustrates an exemplary pivot arm 800. Pivot arm 800 includes a curved contact surface 804. Curved contact surface 804 gradually curves upward. In this exemplary embodiment, the entire curved contact surface 804 is a continual curve.

Figure 9:
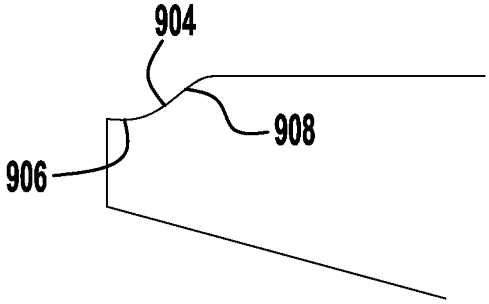

FIG. 9 illustrates another exemplary pivot arm 900. Pivot arm 900 includes a curved contact surface 904. Curved contact surface 904 has a first portion 906 and the second portion 908. First portion 906 has a flat or mild curve upward, and second portion 708 has a steeper upward curve. In some exemplary embodiments, curved contact surface 904 has more than two portions. In some exemplary embodiments, curved contact surface 904 has less than two portions.

Figure 10:
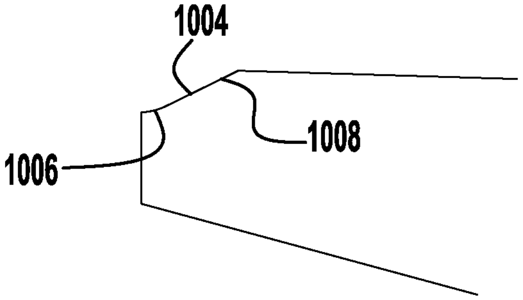

FIG. 10 illustrates an exemplary pivot arm 1000. Pivot arm 1000 includes a curved contact surface 1004. Curved contact surface 1004 has a first portion 1006 and the second portion 1008. First portion 1006 is gradually curved upward, and second portion 1008 is linear. In some exemplary embodiments, curved contact surface 1004 has more than two portions. In some exemplary embodiments, curved contact surface 1004 has less than two portions.

In some embodiments, when the pivot members initially start moving upward, the cam travels along the gradual curve and once the pivot members start moving the curve gets steeper and moves it engagement mechanism at a quicker rate. In some exemplary embodiments, this allows for a lower force initially to start the movement of the pivot arms, while still generating enough travel to dispense a full dose of fluid. The type of curve can be a compound curve, a complex curve a straight line, it may have multiple curved portions. In some embodiments the first curved portion has a different slope then the second curved portion. In some embodiments, the curved surface may be a combination of two or more differently sloped surfaces.

In the exemplary embodiments, preferably the load required to push the pushbar is 5 pounds or less. In some embodiments, the initial force required to push the pushbar is about 5 pounds and then the force required to move the pushbar decreases. In some embodiments, the initial force required to push the pushbar is less than 5 pounds and increases to about 5 pounds. In some embodiments, the force required to push the pushbar remains at about 5 pounds throughout the travel pushbar in some embodiments, and in some embodiments, the force needed to push the pushbar is less than 5 pounds through a selected portion of the pushbar travel. In some embodiments, the selected portion of the pushbar travel that requires 5 pounds or less, is about 75% of the total pushbar travel. In some embodiments, the selected portion of the pushbar travel that requires 5 pounds or less, is about 60% of the total pushbar travel. In some embodiments, the selected portion of the pushbar travel that requires 5 pounds or less, is about 50% of the total pushbar travel.4

While the present invention has been illustrated by the description of embodiments thereof and while the embodiments have been described in considerable detail, it is not the intention of the applicants to restrict or in any way limit the scope of the appended claims to such detail. Additional advantages and modifications will readily appear to those skilled in the art. Moreover, elements described with one embodiment may be readily adapted for use with other embodiments. Therefore, the invention, in its broader aspects, is not limited to the specific details, the representative apparatus and illustrative examples shown and described. Accordingly, departures may be made from such details without departing from the spirit or scope of the applicants' general inventive concept.

We claim:

1. A manual soap, sanitizer or lotion dispenser comprising:
- a housing;
- a receptacle for receiving a container of fluid;
- and an actuating mechanism for causing fluid to be dispensed from the container;
- the actuation mechanism having
  - a first pivot arm having a pivot point on a first end, an engagement mechanism connection point at a second end, and a cam located therebetween;
  - a second pivot arm having a pivot point a first end and a curved contact surface on a second end;
  - wherein the first and second pivot points are located below a bottom of the container of fluid; and
  - a pushbar;
  - wherein one of the first and second pivot members is connected to the pushbar;
  - wherein when the pushbar is pushed inward, the cam is configured to travel along the curved contact surface;
  - wherein movement of the cam along the curved contact surface moves an engagement mechanism upward and downward in a substantially linear motion when the engagement mechanism is connected to a pump to cause the pump to prime with fluid and dispense the fluid.

2. The manual soap, sanitizer or lotion dispenser of claim 1 wherein the curved contact surface has a first curved portion and a second curved portion and wherein the second curved portion has a greater slope.

3. The manual soap, sanitizer or lotion dispenser of claim 1 wherein the engagement mechanism comprises a slot for connecting to the second pivot arm.

4. The manual soap, sanitizer or lotion dispenser of claim 1 wherein the pushbar requires 5 pounds or less for over 75% of its full travel length.

5. The manual soap, sanitizer or lotion dispenser of claim 1 wherein the pushbar requires 5 pounds or less for over 50% of its full travel length.

6. The manual soap, sanitizer or lotion dispenser of claim 1 wherein one of the first pivot arm and the second pivot arm has a pivot point near the rear of the dispenser and the other of the first pivot arm and the second pivot arm has a pivot point near the front of the dispenser.

7. The manual soap, sanitizer or lotion dispenser of claim 1 wherein one of the first pivot arm and the second pivot arm is integrally formed with the pushbar.

8. A manual soap, sanitizer or lotion dispenser comprising:
- a housing;
- a receptacle for receiving a container of fluid;
- and an actuating mechanism for causing fluid to be dispensed from the container;
- the actuation mechanism having
  - a first pivot arm having a pivot point on a first end, a cam, and a projection on the second end;
  - the first pivot arm is connected to one of the front portion and rear portion of the dispenser;
  - a second pivot arm having a pivot point on a first end and a curved contact surface along a portion of the pivot arm;
  - the second pivot arm connected to the other of the front portion and rear portion of the dispenser; and
  - a pushbar;
  - wherein one of the first and second pivot members is connected to the pushbar;
  - an engagement mechanism having a connector for connecting to one of the first pivot member and the second pivot member;
  - the engagement member having an receptacle for receiving a pump;
  - wherein the engagement member has a receiving member for receiving the projection on the second end of the first pivot arm;
  - wherein when the pushbar is pushed inward, the cam is configured to travel along the curved contact surface;
  - wherein movement of cam along the curved contact surface moves the engagement mechanism upward and downward to dispense fluid and to prime the pump.

9. The manual soap, sanitizer or lotion dispenser of claim 8 wherein the curved contact surface has a first curved portion and a second curved portion and wherein the second curved portion has a greater slope.

10. The manual soap, sanitizer or lotion dispenser of claim 8 wherein the engagement mechanism comprises a slot for connecting to one of the first pivot arm and the second pivot arm.

11. The manual soap, sanitizer or lotion dispenser of claim 8 wherein the pushbar requires 5 pounds or less for over 75% of its full travel length.

12. The manual soap, sanitizer or lotion dispenser of claim 8 wherein the pushbar requires 5 pounds or less for over 50% of its full travel length.

13. A manual soap, sanitizer or lotion dispenser comprising:
- a housing;
- a receptacle for receiving a container of fluid;
- and an actuating mechanism for causing fluid to be dispensed from the container;
- the actuation mechanism having
  - a first pivot arm having a pivot point and a cam;
  - a second pivot arm having a pivot point on a first end and a curved contact surface;
  - at least one of the first pivot arm and the second pivot arm having an engagement mechanism connection point for slidably engaging an engagement mechanism; and a pushbar formed as a part of one of the first pivot arm and the second pivot arm;

the pushbar rotates about the same pivot point as the one of the first pivot arm and the second pivot arm;

wherein when the pushbar moves the cam is configured to travel along the curved contact surface to move the engagement member upward and downward in a linear motion; and wherein as the engagement member moves upward and downward, the engagement member moves toward or away from a second end of one of the first pivot arm and the second pivot arm.

14. The manual soap, sanitizer or lotion dispenser of claim 13 wherein the curved contact surface has a first curved portion and a second curved portion and wherein the second curved portion has a greater slope.

15. The manual soap, sanitizer or lotion dispenser of claim 13 wherein the engagement mechanism comprises a slot for connecting to one of the first and second pivot arms.

16. The manual soap, sanitizer or lotion dispenser of claim 13 wherein the pushbar requires 5 pounds or less for over 75% of its full travel length.

17. The manual soap, sanitizer or lotion dispenser of claim 13 wherein the pushbar requires 5 pounds or less for over 50% of its full travel length.

18. The manual soap, sanitizer or lotion dispenser of claim 13 wherein the engagement mechanism connection point is located proximate the end of the first pivot arm.

19. The manual soap, sanitizer or lotion dispenser of claim 13 wherein the first pivot arm comprises a pair of arms.

20. The manual soap, sanitizer or lotion dispenser of claim 13 wherein the second pivot arm comprises a pair of arms.

* * * * *